US008642971B2

(12) United States Patent
Luszik-Bhadra et al.

(10) Patent No.: US 8,642,971 B2
(45) Date of Patent: Feb. 4, 2014

(54) NEUTRON DOSIMETER

(75) Inventors: Marlies Luszik-Bhadra, Braunschweig (DE); Eike Hohmann, Brugg (CH)

(73) Assignee: Bundesrepublik Deutschland, Vertreten Durch das Bundesministerium F. Wirtschaft und Technologie, Dieses Vertreten D.D. Prasidenten der Physikalisch-Technischen, Braunschweig (DE)

(*) Notice: Subject to any disclaimer, the term of this patent is extended or adjusted under 35 U.S.C. 154(b) by 266 days.

(21) Appl. No.: 13/122,644

(22) PCT Filed: Aug. 26, 2009

(86) PCT No.: PCT/DE2009/001199
§ 371 (c)(1),
(2), (4) Date: Apr. 5, 2011

(87) PCT Pub. No.: WO2010/040330
PCT Pub. Date: Apr. 15, 2010

(65) Prior Publication Data
US 2011/0180718 A1    Jul. 28, 2011

(30) Foreign Application Priority Data
Oct. 8, 2008   (DE) .................. 10 2008 050 731

(51) Int. Cl.
*G01T 3/00*    (2006.01)
(52) U.S. Cl.
USPC .................................... 250/390.01
(58) Field of Classification Search
CPC ..................................... G01T 3/006
USPC ................................. 250/390.01
See application file for complete search history.

(56) References Cited

U.S. PATENT DOCUMENTS

| 3,497,692 A | | 2/1970 | Mills |
| 4,476,391 A | * | 10/1984 | Bednarczyk ............. 250/390.01 |
| 4,617,167 A | * | 10/1986 | Kruse et al. .................. 376/153 |
| 4,931,649 A | | 6/1990 | Czirr et al. |
| 6,362,485 B1 | | 3/2002 | Joyce et al. |

FOREIGN PATENT DOCUMENTS

| DE | 691575 | 3/1940 |
| DE | 4344955 C1 | 2/1995 |

(Continued)

OTHER PUBLICATIONS

E.Becker "Neutronen Radiographie zur Grobstruktur-Untersuchung", Isotopenpraxis 12. Jg. (Volume), Heft (Issue) Dec. 1976, pp. 449-548.

(Continued)

*Primary Examiner* — Constantine Hannaher
(74) *Attorney, Agent, or Firm* — Hahn, Loeser & Parks, LLP

(57) ABSTRACT

The invention relates to a neutron dosimeter comprising a neutron moderator (12), a first radiation detector (14), which is situated in the neutron moderator (12) and is surrounded by a first metal body (28) containing material that can be activated by neutrons, a second radiation detector (16), which is situated in the neutron moderator (12) close to the first radiation detector (14) and is surrounded by a second metal body (30) that substantially cannot be activated by neutrons. The first metal body (28) and the second metal body (30) are designed in such a way that they substantially have the same degree of absorption of photons. The dosimeter also comprises an evaluation circuit, which is connected to the radiation detectors and is equipped to suppress electrical impulses generated by ionising radiation using a pulse intensity that lies below a predefined pulse intensity threshold.

12 Claims, 2 Drawing Sheets

(56) References Cited

FOREIGN PATENT DOCUMENTS

Figure 1:
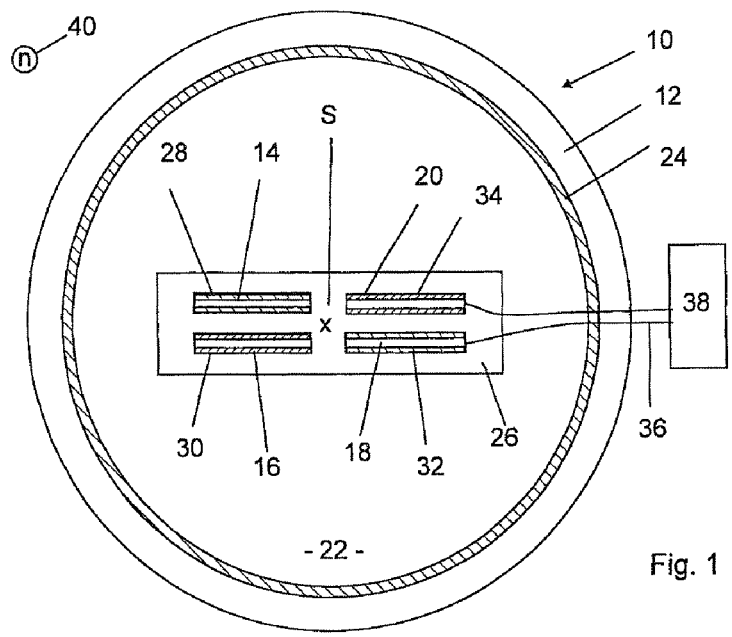

| DE | 102004020979 A1 | | 11/2005 |
|---|---|---|---|
| EP | 1903355 A2 | | 3/2008 |
| SU | 417751 | * | 7/1974 |
| WO | WO 2005106532 A2 | * | 11/2005 |

OTHER PUBLICATIONS

Brown D., Buchanan, R.J.; Koelle A.R.: "A microcomputer-based portable radiation survey instrument for measuring pulsed neutron dose rates", Health Physics, Bd. 38, Nr. 4, Apr. 1980, p. 507-521, XP8122948.

* cited by examiner

NEUTRON DOSIMETER

The invention relates to a neutron dosimeter. According to a second aspect, the invention relates to a method for measuring a neutron dose.

Neutron dosimeters are used in radiation protection. It was found that conventional neutron dosimeters, as described in DE 43 44 955 C1, underestimate the actual dose in pulsed neutron fields as a result of dead-time effects; this is undesirable.

EP 1 903 355 A2 has disclosed that neutrons in pulsed radiation fields, as generated by high-energy accelerators, can be detected by making them react with material containing $^{12}C$ or $^9Be$, which is activated by the neutron irradiation, with the activated nucleus for example emitting beta radiation and the resulting beta radiation being detected. A disadvantage of available neutron dosimeters of this type is that they can only detect neutrons above an energy threshold, which, for example, may lie above 1 MeV. Other known neutron dosimeters, as described in Health Physics 38 (1980), pages 507-521, detect lower energy neutrons by the activation of silver, but additionally are disadvantageous in that inhomogeneous radiation fields with accompanying photon radiation can lead to significant measurement errors, and so a field calibration has to be performed every time there is a change into a different radiation field.

The invention is based on the object of improving the measurement accuracy in the case of pulsed neutron fields in the presence of at least photon radiation.

The invention achieves the object by a neutron dosimeter with (a) a neutron moderator, (b) a first radiation detector, which is arranged in the neutron moderator and is surrounded by a first metal body containing material that can be activated by neutrons, (c) a second radiation detector, which is arranged in the neutron moderator in the direct vicinity of the first radiation detector and is surrounded by a second metal body that substantially cannot be activated by neutrons, (d) wherein the first metal body and the second metal body are designed such that they substantially have the same photon absorption, and (e) an evaluation circuit, which is connected to the radiation detectors and designed to suppress electric pulses that are caused by ionizing radiation and have a pulse height that is below a prescribed pulse-height threshold.

According to a second aspect, the invention achieves the object by a method for measuring a neutron dose, comprising the following steps: (a) registering count rates using a first radiation detector, which is arranged in a neutron moderator and is surrounded by a first metal body containing material that can be activated by neutrons, (b) registering count rates using a second radiation detector, which is arranged in the neutron moderator in the direct vicinity of the first radiation detector and is surrounded by a second metal body, wherein the first metal body and the second metal body are designed such that they substantially have the same photon absorption, and (c) establishing the neutron dose from the count rates by calculating the count rate resulting from beta radiation from, firstly, the count rate from the first radiation detector and, secondly, the count rate from the second radiation detector and calculating the neutron dose from the count rate resulting from beta radiation, wherein registering the count rates using the first radiation detector and the second radiation detector comprises a suppression of count events below a prescribed pulse-height threshold.

An advantage of the invention is that the neutron dose can be registered effectively and is not underestimated, even in the case of pulsed neutron fields. A further advantage is that inhomogeneous radiation fields can also be measured with high measurement accuracy. Furthermore, it is substantially only neutrons that are registered, whereas other radiation can be masked. Thus, a varying gamma-radiation background only leads to small measurement inaccuracies. Hence there is no need to calibrate the neutron dosimeter in situ to the respective radiation field.

An additional advantage is that a short response time can be achieved using the neutron dosimeter according to the invention. As a result, an increase in the neutron-dose power can be quickly identified. If necessary, persons can then be brought to safety quickly.

The measurement accuracy is increased by the evaluation circuit, which is connected to the radiation detectors and designed to suppress electric pulses that are caused by ionizing radiation and have a pulse height that is below a prescribed pulse-height threshold. This is because it was unexpectedly found that possible background radiation, for example gamma radiation, can lead to significantly impaired measurement accuracy.

Within the scope of the following description, a neutron moderator is more particularly understood to mean any component consisting of a material that can be used to decelerate (thermalize) neutrons. Moreover, the neutron moderator is preferably designed to form an at least substantially closed shell around the radiation detectors. By way of example, the neutron moderator contains a hydrogen-rich compound, for example a polyolefin such as polyethylene.

A radiation detector is more particularly understood to mean any device that converts ionizing radiation into electrical signals. The feature that the respective radiation detector is arranged in the neutron moderator is more particularly understood to mean that the former is completely surrounded by the neutron moderator. It is possible, but not necessary, for the radiation detector to be embedded in the neutron moderator. By way of example, the neutron moderator can be designed as a spherical shell, within which the radiation detectors are arranged.

The feature that the first metal body can be activated by neutrons is more particularly understood to mean that, for example, the former contains enough metal for irradiation of the metal body with neutrons to lead to a nuclear reaction, from which, directly or indirectly, a radioactive isotope emerges. The half-life is preferably below one minute in particular. The feature that the second metal body substantially cannot be activated by neutrons is more particularly understood to mean that the activation probability for the material of the second metal body is orders of magnitude smaller than the activation probability for the material of the first metal body, for example smaller than one thousandth.

The feature that the first metal body and the second metal body are designed such that they substantially have the same photon absorption is more particularly understood to mean that their absorption differs by less than 20% over a broad region of photon energy, for example between 1 MeV and 3 MeV. By way of example, this can be achieved by virtue of the fact that the metal bodies are made from metals that only have small differences in their atomic numbers.

According to a preferred embodiment, the dosimeter comprises a third radiation detector, which is arranged in the neutron moderator and surrounded by a third metal body containing material that can be activated by neutrons, and a fourth radiation detector, which is likewise arranged in the neutron moderator and surrounded by a fourth metal body that substantially cannot be activated by neutrons, wherein the radiation detectors are arranged rotationally symmetrically. This makes it possible for the neutron dosimeter to measure inhomogeneous radiation fields particularly well.

It is particularly preferred for the four radiation detectors to be arranged such that they have symmetry, more particularly a 180° rotational symmetry. However, it is also possible for provision to be made for more than four radiation detectors.

Semiconductor detectors, more particularly silicon semiconductor-detectors, were found to be suitable radiation detectors.

The pulse-height threshold is particularly preferably more than 600 keV, for example at 660 keV. This effectively discriminates against quanta emitted by Cs-137. So that there are no detrimental effects to the measurement accuracy, the pulse-height threshold should lie below 1 MeV, more particularly below 800 keV.

In a preferred embodiment, the evaluation circuit is designed to suppress electric pulses that are caused by ionizing radiation and have a pulse height that is above a prescribed pulse-height threshold. Pulse-height thresholds of at most 800 keV are well suited. However, it is also feasible to select this upper pulse-height threshold to be less than 1000 keV or even 2000 keV. This suppresses a high-energy background and the measurement accuracy is further increased.

A neutron dosimeter, which is particularly easy to manufacture and accurate, is obtained if the neutron moderator is spherical-shell-shaped and the radiation detectors are arranged in the direct vicinity of the center of the sphere of the spherical shell. More particularly, this should be understood to mean that the radiation detectors are arranged such that the center of gravity of this arrangement lies close to the center of the sphere, for example within the inner third with respect to the radius of the sphere. Particularly suitable radii for the sphere lie between 10 and 20 cm, more particularly at 15 cm.

According to a preferred embodiment, the first metal body comprises a silver foil. Silver occurs naturally in the form of $^{109}$Ag and $^{107}$Ag isotopes, which both absorb neutrons whilst emitting gamma radiation and decay to cadmium as beta emitters. On the one hand, this occurs in accordance with the equation

$$^{109}\text{Ag}+n \rightarrow \gamma + {}^{110}\text{Ag} \rightarrow {}^{110}\text{Cd}+\beta \quad (1)$$

with a thermal cross section of 90.5 barn, the half-life of $^{110}$Ag being 25 seconds and the maximum energy of the beta radiation being $E_{max}$=2.9 MeV. The other equation is

$$^{107}\text{Ag}+n \rightarrow \gamma + {}^{108}\text{Ag} - {}^{108}\text{Cd}+\beta^- \quad (2),$$

with a cross section of 38.6 barn, a half-life of 144 seconds and the maximum energy during beta decay being $E_{max}$=1.7 MeV.

The thickness of the silver foil is preferably selected such that it approximately corresponds to the mean penetration of the respective beta radiation in silver.

The second metal body preferably comprises a tin foil. In respect of photon absorption, tin has a similar characteristic as silver, but tin can only be activated by neutrons to a small extent (cross section one mbarn).

According to a preferred embodiment, the neutron dosimeter comprises an evaluation unit, which is designed to carry out a method automatically, the method comprising the steps of: (i) registering count rates from the radiation detectors and calculating the count rate resulting from beta radiation from, firstly, the count rate from the first radiation detector and, optionally, the third radiation detector and, secondly, the count rate from the second radiation detector and, optionally, the fourth radiation detector. Provided that there are more than four radiation detectors, the count rate resulting from beta radiation is correspondingly calculated from the count rates from all radiation detectors. Since the photon absorption is the same for both metal bodies but only the first metal body can be activated by neutrons, it is possible to eliminate a photon-background from the calculation. This affords the possibility of measuring the neutron dose in a particularly accurate fashion. Reference is made to the fact that external alpha and beta radiation is already screened to a large extent by the neutron moderator.

More particularly, there is a suppression of count results that have a pulse height below a prescribed pulse-height threshold of, for example, 600 keV, more particularly 660 keV, in order to suppress the $^{137}$Cs background.

In order to register particularly high-energy neutrons with energies of above 10 MeV, an intermediate layer (e.g. lead) can be arranged within the moderator. In this layer, high-energy neutrons generate a plurality of low-energy neutrons as a result of a spallation reaction of the atomic nuclei, which leads to an increase in the detector response in the center of the moderator.

Figure 2:
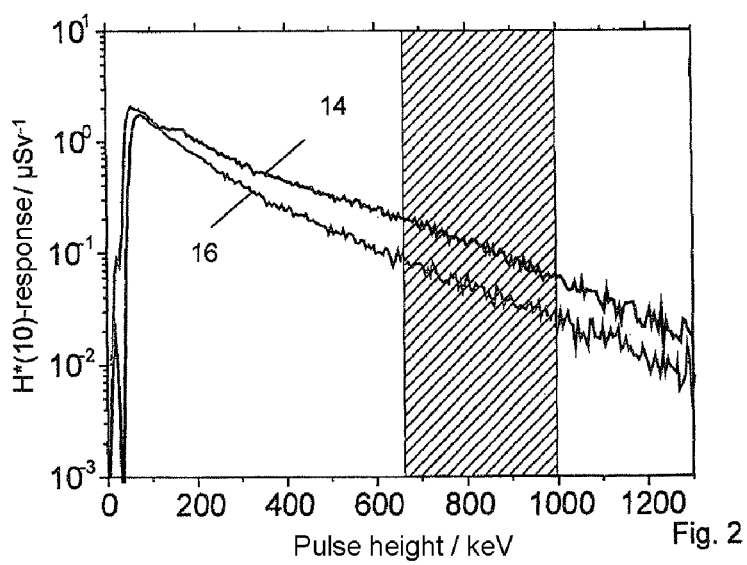
Figure 3:
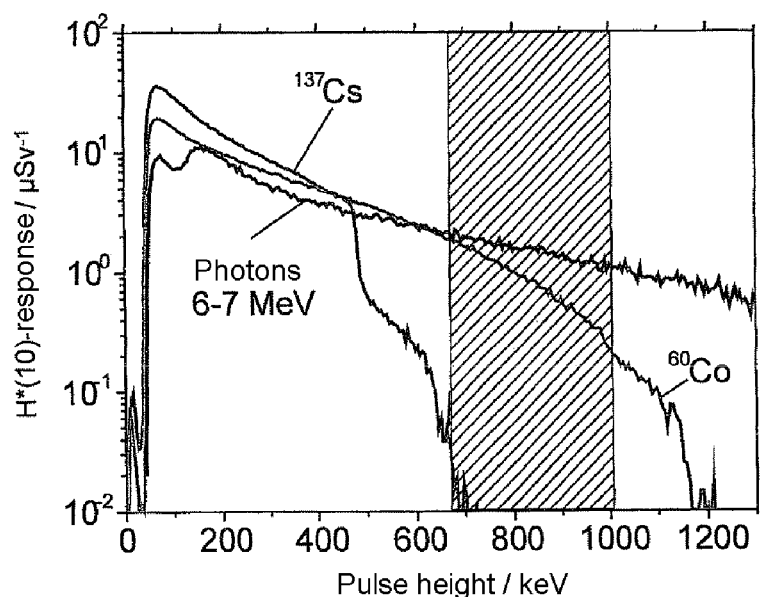
Figure 4:
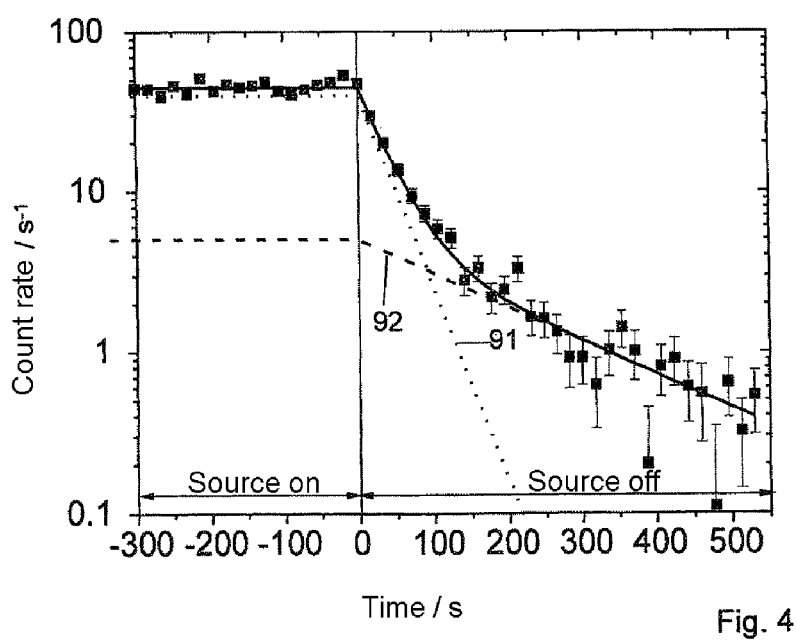

In the following text, the invention will be explained in more detail on the basis of an illustrative exemplary embodiment. Herein, FIG. 1 shows a cross section through a neutron dosimeter according to the invention, FIG. 2 shows a pulse-height spectrum recorded by the neutron dosimeter as per FIG. 1 under irradiation by a $^{252}$Cf source, FIG. 3 shows a pulse-height spectrum recorded by a silicon semiconductor detector from the neutron dosimeter as per FIG. 1 under irradiation by $^{137}$Cs, $^{60}$Co and photons with an energy between 6 and 7 MeV, and FIG. 4 shows a count rate relating to 10 second measurement periods, which was recorded by the neutron dosimeter as per FIG. 1 after irradiation by a $^{252}$Cf source.

FIG. 1 shows a neutron dosimeter 10 with a neutron moderator 12 made of polyethylene, a first radiation detector 14, a second radiation detector 16, a third radiation detector 18 and a fourth radiation detector 20.

All radiation detectors 14, 16, 18, 20 are silicon semiconductor detectors, in the present case with an area of 8.5×10.5 mm² and an effective layer thickness of 0.48 mm (when a voltage of 80 V is applied), and arranged in the neutron moderator 12 and surrounded by the latter. A spherical shell 24 made of aluminum is arranged between the neutron moderator 12 and an accommodation space 22, in which the radiation detectors 14, 16, 18, 20 are arranged. The accommodation space 22 is filled with air. The neutron moderator 12 is a polyethylene spherical shell with an external diameter of approximately 30 cm (12").

The radiation detectors 14, 16, 18, 20 are embedded in epoxy resin 26 and thus fixed spatially with respect to one another. The arrangement of radiation detectors has a center of gravity S, which coincides with the center of gravity of a sphere of the spherical-shell-shaped neutron moderator 12. The first radiation detector 14 is surrounded by a first metal body 28 in the form of a silver foil with a thickness of 250 μm. The second radiation detector 16 is surrounded by a second metal body 30 in the form of a 360 μm-thick tin foil. Similarly, the third radiation detector 18 is surrounded by a third metal body 32, which is embodied like the first metal body 28. The fourth radiation detector 20 is surrounded by a fourth metal body 34, which is embodied like the second metal body 30.

The four radiation detectors 14, 16, 18 and 20 are connected to an evaluation unit 38 via schematically illustrated cables 36.

If a schematically illustrated neutron 40 impinges into the neutron dosimeter 10, it is firstly thermalized by the neutron moderator and then comes in contact with e.g. the first metal body 28. Then the reactions (1) $^{109}Ag+n \rightarrow \gamma + {}^{110}Ag \rightarrow {}^{110}Cd + \beta^-$ and (2) $^{107}Ag+n \rightarrow \gamma + {}^{108}Ag \rightarrow {}^{108}Cd + \beta^-$ take place (see above).

The first radiation detector 14 then registers the beta radiation emitted by the decay of the $^{110}Ag$ and $^{108}Ag$ isotopes and transmits the corresponding count pulse to the evaluation unit 38.

If the neutron 40 impinges into the second metal body 30, there is no activation and the neutron is not registered. However, both radiation detectors, 14 and 16, register gamma quanta, which are likewise contained in the radiation field.

The evaluation unit 38 registers the count rate, firstly, from the first and third radiation detectors and, secondly, from the second and fourth radiation detectors and subtracts these count rates from one other, possibly in a weighted fashion, and so the count rate that is obtained is only based on the neutron activation of the silver—substantially based on beta radiation. In other words, the evaluation unit 38 eliminates the gamma-ray background.

FIG. 2 shows an illustration of the ambient dose equivalent H*(10), plotted against the pulse height under irradiation by a $^{252}Cf$ source. The definition of the ambient dose equivalent H*(10) can be gathered from the ICRP Publication 74, Annals of the ICRP 26, No. 3-4, Pergamon Press, Oxford, 1996.

What can be identified is that the first radiation detector 14, which is surrounded by silver foil, supplies a higher count rate for the pulse height than the second radiation detector 16, which is surrounded by tin foil. The difference between these two curves is caused by the beta radiation, which in turn is the product of the nuclear reaction presented above.

FIG. 3 shows an illustration of the H*(10) response of the first radiation detector 14 when irradiated by pure gamma radiation by sources of $^{137}Cs$, $^{60}Co$ and photons with an energy of between 6 and 7 MeV. What can be identified is that photons from the $^{137}Cs$ source substantially no longer supply a contribution to the H*(10) response beyond a pulse height of approximately 660 keV. It is for this reason that a pulse-height threshold of between 600 keV and 660 keV is selected in a preferred embodiment because this allows discrimination against a strong $^{137}Cs$ background. When irradiated by gamma radiation, the second radiation detector supplies pulse-height spectra that, within the scope of measurement uncertainty, cannot be distinguished from those of the radiation detector 14.

FIG. 4 shows the count rate recorded by the neutron dosimeter as per FIG. 1 in the case of irradiation by a $^{252}Cf$ source, which is switched off at time t=0. What can be identified is that the count rate decays over time, with two exponential decay curves being superposed over one another. The first decay curve, illustrated by the dotted straight line g1, is associated with a half-life of 25 seconds and relates to the decay of $^{110}Ag$. The decay curve illustrated by the line of best fit g2 is associated with a half-life of 144 seconds for the decay of $^{108}Ag$.

When irradiated by neutrons, $^{110}Ag$ and $^{108}Ag$ form in the ratio of approximately 2.2:1, which corresponds to their proportional occurrence in $^{nat}Ag$ (48% and 52%) and the proportion of the cross sections of the involved nuclear reactions (90.5:38.6). However, since the mean energy of the beta radiation from the $^{110}Ag$ isotope is greater than that of the $^{108}Ag$ isotope, the beta-signals from $^{110}Ag$ are detected more effectively than those from $^{108}Ag$ as a result of the pulse-height threshold at 660 keV. A factor of 8 emerges from the measured decay curves. As a result, the pulses from $^{110}Ag$ dominate, which isotope decays with a short half-life and therefore quickly produces detectable beta radiation. As a result, intensive neutron radiation can already be detected shortly after the onset of this neutron radiation. Hence, the neutron dosimeter according to the invention has a very short reaction time of a few seconds.

The evaluation unit 38 shown in FIG. 1 is designed to receive energy pulses from the radiation detectors 14, 16, 18, 20 and to discard those pulses that have a pulse height of less than a pulse-height threshold of 660 keV and more than a pulse-height threshold of 1 MeV. The remaining pulses from, firstly, the first and third radiation detectors 14, 18 and, secondly, the second and fourth radiation detectors 16, 20 are subtracted from one another. If need be, a weighted subtraction is carried out using calibration parameters set in a calibration process.

This difference is used to establish the H*(10) measurement value by multiplication with a factor, which is likewise obtained by calibration; this measurement value is output via an interface (not illustrated). This interface can be e.g. a display or a wireless interface, by means of which the neutron dosimeter 10 transmits the measurement values to a central computer.

In order to calibrate the neutron dosimeter 10, the latter is irradiated by sources with a stated strength, and possible measurement deviations are compensated for by correction factors. The following table specifies measurement values that represent the count rates for different types of radiation.

| Radiation source | With Ag-foil/ $\mu Sv^{-1}$ | With Sn-foil/ $\mu Sv^{-1}$ | Neutrons/ $\mu Sv^{-1}$ |
|---|---|---|---|
| $^{60}Co$, 0° | 112.3 ± 0.3 | 113.5 ± 0.3 | −1.2 ± 0.4 |
| $^{60}Co$, 90° right | 87.5 ± 0.3 | 87.2 ± 0.3 | 0.4 ± 0.4 |
| $^{60}Co$, 90° left | 82.6 ± 0.3 | 81.4 ± 0.3 | 1.2 ± 0.4 |
| $^{60}Co$, 90° top | 100.5 ± 0.3 | 101.3 ± 0.3 | −0.8 ± 0.4 |
| $^{60}Co$, 90° bottom | 103.8 ± 0.3 | 102.5 ± 0.3 | 1.2 ± 0.4 |
| 6-7 MeV γ-rad., 0° | 195.6 ± 1.0 | 196.7 ± 1.0 | −1.1 ± 1.4 |
| 6-7 MeV γ-rad., 90° right | 181.3 ± 1.0 | 180.1 ± 1.0 | 1.2 ± 1.3 |
| 6-7 MeV γ-rad., 90° left | 179.0 ± 1.0 | 177.3 ± 0.9 | 1.6 ± 1.3 |
| 6-7 MeV γ-rad., 90° top | 181.0 ± 1.0 | 181.6 ± 1.0 | −0.7 ± 1.3 |
| 6-7 MeV γ-rad., 90° bottom | 176.6 ± 0.9 | 175.2 ± 0.9 | 1.4 ± 1.3 |
| Thermal neutrons | 18.4 ± 0.3 | 12.5 ± 0.3 | 5.9 ± 0.5 |
| 144 keV neutrons | 10.9 ± 0.2 | 4.3 ± 0.1 | 6.6 ± 0.3 |
| 250 keV neutrons | 9.3 ± 0.2 | 3.5 ± 0.1 | 5.8 ± 0.2 |
| 565 keV neutrons | 8.3 ± 0.1 | 2.5 ± 0.04 | 5.8 ± 0.1 |
| 1.2 MeV neutrons | 10.1 ± 0.05 | 2.2 ± 0.02 | 7.9 ± 0.1 |
| 2.5 MeV neutrons | 14.1 ± 0.04 | 2.7 ± 0.02 | 11.4 ± 0.1 |
| 5.0 MeV neutrons | 14.2 ± 0.06 | 3.2 ± 0.03 | 11.0 ± 0.1 |
| 8.0 MeV neutrons | 13.3 ± 0.05 | 3.4 ± 0.03 | 9.9 ± 0.1 |
| 14.8 MeV neutrons | 7.5 ± 0.04 | 2.3 ± 0.02 | 5.2 ± 0.1 |
| $^{252}Cf$ (open) | 14.6 ± 0.3 | 5.6 ± 0.2 | 9.0 ± 0.4 |
| $^{252}Cf$ ($D_2O$ moderated) | 25.0 ± 0.9 | 14.7 ± 0.51 | 10.3 ± 1.2 |
| $^{241}Am$—Be | 10.3 ± 0.3 | 4.1 ± 0.2 | 6.2 ± 0.4 |

What can be identified is that, within statistical deviation, the neutron dosimeter selectively only registers neutron radiation with high sensitivity of 9.0±0.4 count events per μSv (see $^{252}Cf$ source).

LIST OF REFERENCE SIGNS

| | |
|---|---|
| 10 | Neutron dosimeter |
| 12 | Neutron moderator |
| 14 | First radiation detector |
| 16 | Second radiation detector |

-continued

| 18 | Third radiation detector |
| 20 | Fourth radiation detector |
| 22 | Accommodation space |
| 24 | Spherical shell |
| 26 | Epoxy resin |
| 28 | First metal body |
| 30 | Second metal body |
| 32 | Third metal body |
| 34 | Fourth metal body |
| 36 | Cable |
| 38 | Evaluation unit |
| S | Center of gravity |

The invention claimed is:

1. A neutron dosimeter with
    (a) a neutron moderator (12),
    (b) a first radiation detector (14),
        which is arranged in the neutron moderator (12) and surrounded by a first metal body (28) comprising a silver foil,
    (c) a second radiation detector (16), which
        is arranged in the neutron moderator (12) in the direct vicinity of the first radiation detector (14) and
        is surrounded by a second metal body (30) comprising a tin foil,
    (d) wherein the first metal body (28) and the second metal body (30) are designed such that they substantially have the same photon absorption, and
    (e) an evaluation circuit, which is connected to the radiation detectors,
    (f) wherein the evaluation circuit is designed to suppress electric pulses that are caused by ionizing radiation and have a pulse height that is below a prescribed pulse-height threshold.

2. The neutron dosimeter as claimed in claim 1, having
    (g) a third radiation detector (18),
        which is arranged in the neutron moderator (12) and surrounded by a third metal body (32) containing material that can be activated by neutrons, and
    (h) a fourth radiation detector (20),
        which is arranged in the neutron moderator (12) and surrounded by a fourth metal body (34) that substantially cannot be activated by neutrons,
    (i) wherein the radiation detectors are arranged symmetrically.

3. The neutron dosimeter as claimed in claim 2, wherein the radiation detectors are arranged rotationally symmetrically.

4. The neutron dosimeter as claimed in claim 2, having an evaluation unit, which is designed to carry out a method automatically, the method comprising the steps of:
    (i) registering count rates from the radiation detectors,
    (ii) calculating the count rate resulting from beta radiation from, firstly, the count rate from the first (14) radiation detector and, optionally, the third radiation detector (18) and, secondly, the count rate from the second radiation detector (16) and, optionally, the fourth radiation detector (20).

5. The neutron dosimeter as claimed in claim 1, wherein the pulse-height threshold lies at more than 300 keV.

6. The neutron dosimeter as claimed in claim 5, wherein the evaluation circuit is designed to suppress electric pulses that are caused by ionizing radiation and have a pulse height that is above a prescribed, second pulse-height threshold, wherein the second pulse-height threshold lies at least at 1000 keV.

7. The neutron dosimeter as claimed in claim 1, wherein at least one of the radiation detectors is a semiconductor detector.

8. The neutron dosimeter as claimed in claim 1, wherein the pulse-height threshold lies at more than 600 keV.

9. The neutron dosimeter as claimed in claim 1, wherein the evaluation circuit is designed to suppress electric pulses that are caused by ionizing radiation and have a pulse height that is above a prescribed, second pulse-height threshold, wherein the second pulse-height threshold lies below 1000 keV.

10. A method for measuring a neutron dose, comprising the following steps:
    (a) registering count rates using a first radiation detector (14),
        which is arranged in a neutron moderator (12) and surrounded by a first metal body (28) containing material that can be activated by neutrons,
    (b) registering count rates using a second radiation detector (16),
        which is arranged in the neutron moderator (12) in the direct vicinity of the first radiation detector (14) and
        surrounded by a second metal body (30) that substantially cannot be activated by neutrons,
            wherein the first metal body (28) and the second metal body (30) are designed such that they substantially have the same photon absorption, and
    (c) establishing the neutron dose from the count rates by calculating the count rate resulting from beta radiation from, firstly, the count rate from the first radiation detector (14) and, secondly, the count rate from the second radiation detector (16) and
        calculating the neutron dose from the count rate resulting from beta radiation,
    (d) wherein registering the count rates using the first radiation detector (14) and the second radiation detector (16) comprises a suppression of count events below a prescribed pulse-height threshold.

11. The method as claimed in claim 10, wherein the pulse-height threshold lies above 600 keV.

12. The method as claimed in claim 10, wherein the pulse-height threshold lies at more than 300 keV.

* * * * *